United States Patent

[11] 3,568,644

[72] Inventor: Georg Schultes
Waldmichelbach, Germany (8752 Kleinosheim near Aschaffenburg, Hirschpfad 3, Germany)
[21] Appl. No.: 818,220
[22] Filed: Apr. 22, 1969
[45] Patented: Mar. 9, 1971
[32] Priority: Apr. 27, 1968
[33] Germany
[31] P 17 57 344.3

[54] STABLING ARRANGEMENT FOR LARGE ANIMALS
8 Claims, 5 Drawing Figs.
[52] U.S. Cl. .................................................. 119/147, 119/148
[51] Int. Cl. .................................................. A01k 1/00
[50] Field of Search .......................................... 119/150; 119/147, 148, 118

[56] References Cited
UNITED STATES PATENTS
1,676,568  7/1928  McCandless ................. 119/147
2,520,385  8/1950  Diehl ............................ 119/148

Primary Examiner—Hugh R. Chamblee
Attorney—Fulwider, Patton, Rieber, Lee & Utecht ABSTRACT: A stabling device for large animals such as cattle that includes a rope having its midportion carried by an overhead support and its opposite ends secured to the floor of a barn. The intermediate length of the rope is crossed above the animal's neck and below its neck. This arrangement permits the animal freedom of movement although it is restrained within its stall.

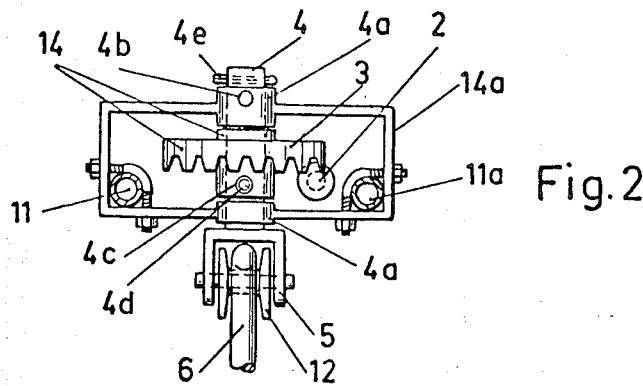
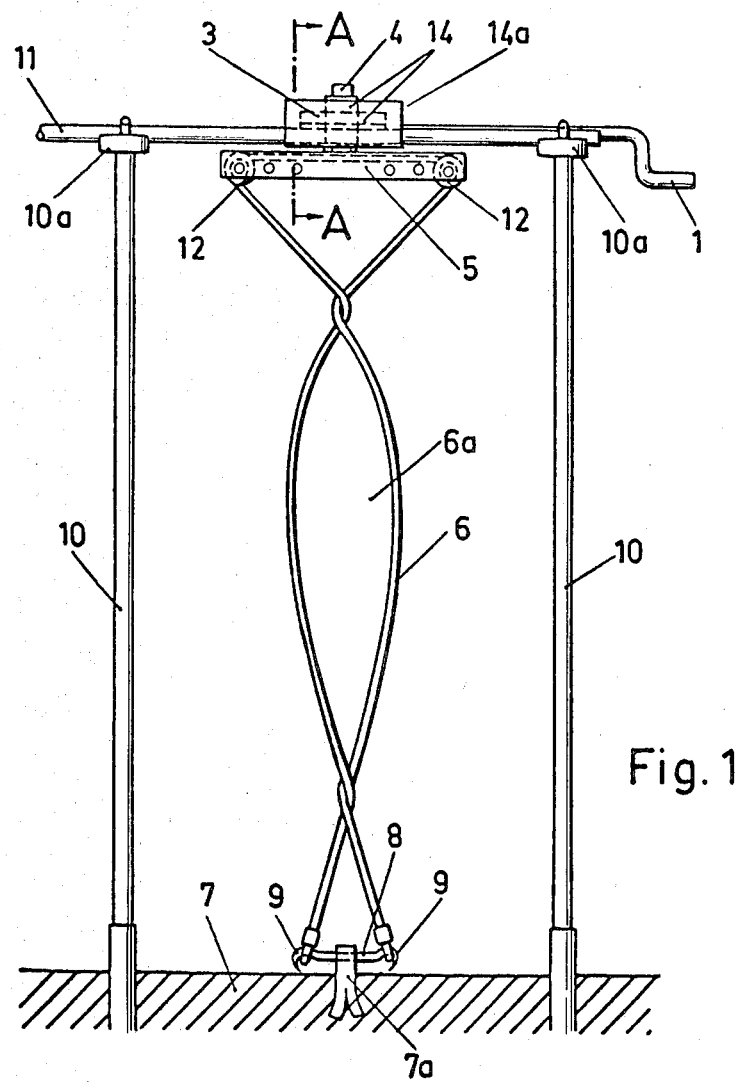

3,568,644

STABLING ARRANGEMENT FOR LARGE ANIMALS

BACKGROUND OF THE INVENTION

1. Field of the Invention

The present invention relates generally to the field of animal husbandry and more particularly to an improved arrangement for stabling large animals without unduly restricting their movements.

2. Description of Prior Art

At the present time the tying up of large animals, especially cattle, in a barn is an important problem, which consists in tying and untying groups of cattle in rows of short or long stall usually situated next to one another, carrying out this operation in such a way as to make it possible for the animal during its stay in the stall to move as unrestrictedly as possible, without e.g. abandoning, in the case of short stalls, the watering channel or gutter that are very important for keeping the animals clean, said channels or gutters representing the rear boundary of the short stall.

A stabling arrangement already known in the art consists of a vertical chain system, in which a chain is tightened vertically in the middle of the frame of a given stall, said chain guiding on both sides a semicircular strap placed around the animal's neck or a second appropriate chain, so that the animal's neck is held on one side by the vertical chain and on the other side by the strap or the second chain. This system has the disadvantage that the animal in the stall in question has only a very limited freedom of movement. Furthermore, it is necessary, for the typing up of each animal, to unhook the chains and the strap, place them around the animal's neck, pass the chain through both ends of the strap, and finally hang them up and tighten them on the horizontal boundary of the stall. Furthermore, it has frequently occurred in the case of this method of typing up by means of vertical chains, especially during the use of two chains, that in the effort of freeing itself from the chains an animal would strangle itself.

Furthermore, a typing up system has become known in the art, in which the neck of the animal is held between rigid pipes which are fixed on the top and bottom in a slightly movable manner. With this system it is possible to tie up animals in an individual or groupwise manner by means of a connecting rod, but still the movements which system permits the animal to execute are so very limited that the animal is hardly able even to stand up or lie down.

SUMMARY OF THE INVENTION

It is a major object of the present invention to provide an animal-stabling apparatus which effectively restrains the animal within a comparatively small area such as a stall while permitting the animal adequate freedom of movement to insure its well-being, but without risk of injury to the animal.

Another object is to provide apparatus of the aforedescribed nature that eliminates the disadvantages of the prior art arrangements of this general nature, such apparatus utilizing a rope loop that receives the animal's neck and follows the movements of such neck.

A further object of the present invention is to provide apparatus of the aforedescribed nature where the rope loop may be readily twisted to receive the animal's neck and untwisted to release the animal. A plurality of loops may be provided for a number of animals and any number of such animals may be selectively restrained or released.

Other objects and advantages of the present invention will become apparent from the following detailed description, when taken in conjunction with the appended drawings.

DESCRIPTION OF THE DRAWINGS

FIG. 1 is a front view of first embodiment of a stabling apparatus embodying the present invention;

FIG. 2 is a vertical sectional view taken in enlarged scale along line A–A in FIG. 1;

DESCRIPTION OF THE PREFERRED EMBODIMENT

Figure 3:
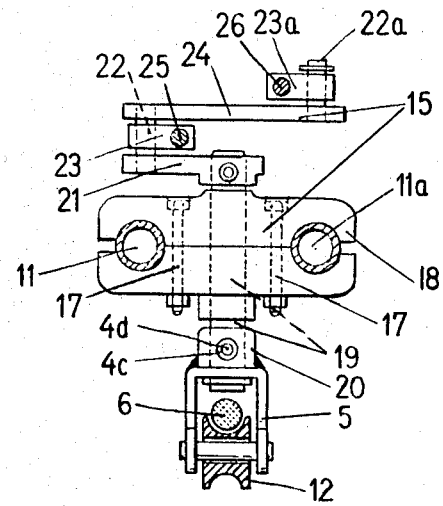
FIG. 3 is a view similar to FIG. 2 showing a second embodiment of the present invention.

Referring to FIGS. 1 and 2, the first embodiment of the present invention includes a pair of upright pipes 10, which at their upper ends are connected with each other by means of horizontal pipes, e.g., by water supply line 11 for watering and vacuum line 11a for a milking installation. The vertical pipes 10 serve as the boundary of two adjacent stable area for cows. The connection of the horizontal pipes 11 and 11a with vertical pipes 10 is by means of V-bolts 10a. An actuating head, generally designated 14, is centrally fastened to the upper horizontal boundary of each individual stall by the vacuum lines 11 and 11a. Head 14 includes a vertically and rotatably disposed axle 4 to whose lower end a horizontal U-rail 5 is rigidly fixed. This rail 5 carries two horizontally adjustable rollers 12 for a rope 6. Approximately in the center below actuating head 14 an anchoring iron 7a is embedded in concrete in the floor of the stall, 7, to which anchoring iron a horizontal iron hoop 8 with two lateral hooks 9 is fastened.

After the assembly of the frame defined by elements 10, 10a, 11, 11a, first one end of rope 6 is placed on iron hoop 8 or hook 9, then rope 6 is passed through the U-shaped inner space of rail 5 through the two rollers 12, back to the second hook 9, and fixed thereat. After a single rotation of U-rail 5 through 360° the rope 6 is superposed or becomes doubly crossed approximately in the lower third of the frame, so that the two upper rope parts of rope 6 form a V which is completed to a triangle by the horizontal U-rail 5. When the animal (not shown) enters the stall his neck is placed in the V and the rope is then twisted by means of an additional 360° turn of the U-rail 5 in the same direction. A loop 6a is thus placed around the animal's neck, rope 6 forming an additional double crossing above the animal's neck.

As may be seen from FIG. 2, the actuating head 14 consists essentially of a rectangular housing 14a which is affixed to the horizontal conduits 11 and 11a and which is provided in the center with an upper and lower slide bearing 4a, in which the axle 4 firmly connected with U-rail 5 is suspended by means of an upper bolt 4e or the like. On axle 4 is disposed, inside housing 14a, a spur bevel gear 3 with a bushing fastened thereon (not assigned a reference number in the drawing), whereby the teeth of the spur bevel gear engage a screw (not shown) placed in shaft 2 of a crank drive 1.

In the case of a groupwise release of several animals restrained in adjoining stalls, spur bevel gear 3 or its bushing is locked by means of a peg 4d in hole 4c on axle 4, so that the movement of crank drive 1 is transmitted through shaft 2 and its screw to the spur bevel gear 3 and thereby to U-rail 5. For the individual release of an animal, peg 4d is removed, whereupon U-rail 5 may be moved manually, since axle 4 slides in bearings 4a, without causing the simultaneous rotation of spur bevel gear 3. If, on the other hand, it is required that a given animal or individual animals remain tied up while others be released in a group, then it is only necessary to insert peg 4d, after its removal from the lower hole 4c, into the upper hole 4b. In this way the U-rail 5 or axle 4 is locked in the upper bearing 4a and thereby in housing 14a.

FIG. 3 shows, as a second embodiment of the present invention, an actuating head 15 in which the rotational movements of U-rail 5 are carried out through a linear to and fro movement of a pair of connecting rods 25 and 26, which are parallel to the upper boundary of the stall, to water and vacuum lines 11 and 11a, to which the actuating head 15 with the carriers or connecting rings 18 is fastened by means of screwbolts 17. The vertical axle 19 possesses, analogously to axle 4 in the first embodiment of the invention a hole 4c, in order to connect, by means of a peg 4d, the sliding socket 20 fastened to U-rail 5 with axle 19. After removal of peg 4d, axle 19 rotates in socket 20, so that U-rail 5 is suspended in such a way that it is freely rotatable on axle 19.

Figure 4:
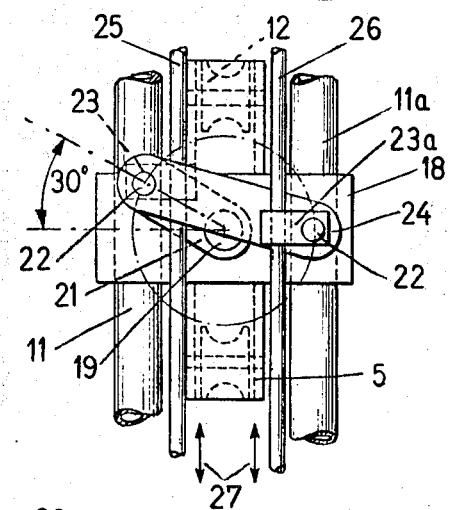
FIG. 4 shows the top view of the apparatus shown in FIG. 3.

As can be seen from FIG. 3 taken in conjunction with FIG. 4, actuating head 15 is driven through an upper crank device 21 through 24, in which connecting rods 25 and 26 are engaged. This crank device consists first of a horizontal lever arm or flange 21 fastened to axle 19, and on the external end of said flange a vertical bolt 22 holds a crank web 23 in a rotatable manner. To this crank web 23 is fastened connecting rod 25 which is common to the parallel stalls and their stabling apparatus. The above-described parts 21, 22 and 23 of the crank device can effect rotation of axle 19 through any desired angle, by the to and fro motion of horizontal connecting rod 25, whereby the horizontal connecting rod 25 undergoes a parallel displacement in its horizontal plane.

In order, during this rotational movement of axle 19, to overcome the dead center at which, for the continuation of the rotation in the same direction the direction of movement of connecting rod 25 must be reversed, there is provided according to the present invention a double pole with connecting rods 25 and 26, whose crank webs 23 and 23a are displaced by 30° with respect to axle 19, so that during the rotation of axle 19 the horizontal crank part 24 connecting the two crank webs 23 and 23a describes an eccentric movement around the center defined by axle 19.

In the case of the actuating head 15 just described, the crank webs may be arranged with all angular displacements between 10° and 90°, but in actual practice it has been found that an angle between 30° and 60° is a favorable one.

Since the second connecting rod 26 or its crank web 23a is placed above crank part 24 on vertical bolt 22a also in a rotatable manner, the two connecting rods 25 and 26 cannot mutually impede each other during their parallel displacement, so that the rotational movement of axle 19 is unrestricted in either direction. In FIG. 4 the to and fro movement of the two connecting rods 25 and 26 is indicated by arrow 27.

Figure 5:
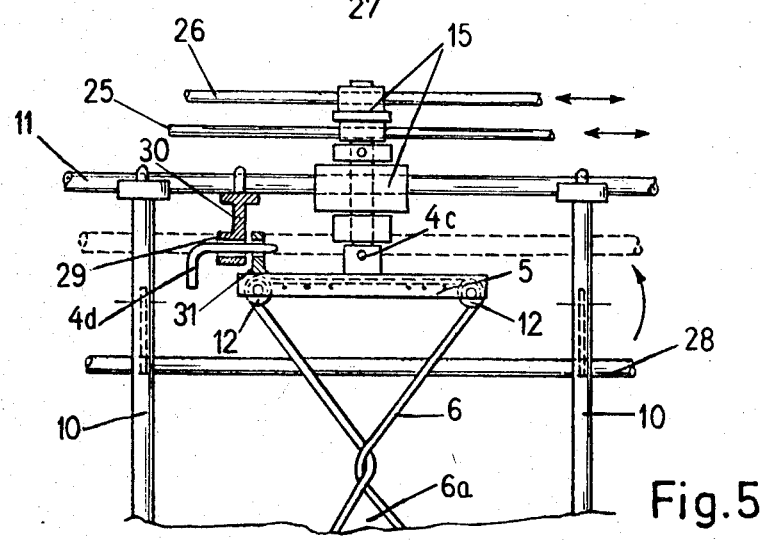
FIG. 5 is a broken front view of a third embodiment of the present invention.

FIG. 5 represents a third embodiment of the stabling apparatus of the present invention, in which an upwardly foldable locking or guide rail 28 is disposed above the animal and behind the rope (when looking towards the stall). With this arrangement, when rope rollers 12 are located in the outer holes in the presence of a relatively long U-rail 5, it is prevented that upon the application of the loop after the entry of the animal into the stall or during the formation of the upper double crossing, a part of the rope with U-rail 5 moves toward the animal and then, as a result of an additional rotation, becomes engaged in the animal's shoulder blade. In this manner an unobjectionable operation of the stabling arrangement is ensured even in this case. After the animal has been tied, this locking or guide rail 28 may be folded upwards into the position shown by the dotted line in FIG. 5, whereby this rail attains a position above U-rail 5, preferentially between U-rail 5 and the upper stall boundary 11, 11a, so that the full freedom of movement of rope 6 is restored.

To lock U-rail 5, especially in the version shown in FIGS. 3 and 4, e.g., after the removal of peg 4d from hole 4c, it is also possible to use a locking device 29 consisting of a clamp 30 fixed to the upper boundary of the stall and a bracket 31 or the like welded to U-rail 5, which are together by a means of peg 4d.

By utilizing the stabling apparatus of the present invention the restrained animal is free to carry out lateral movements such as kneeling, lying down and other types of position change in an almost unimpeded manner, without injuring itself or becoming strangled. Furthermore, the animal is able to pick up in a comfortable manner any fodder that has dropped along its side, and clean all parts of its body by itself. Since the animal is but lightly obstructed, it always assumes the position in which it feels most comfortable whereby the well-being of the animal and thereby its efficiency are considerably increased. The rope, which is itself capable of yielding, can follow the animal's movement extensively, thanks to its suspension on the rollers 12. In addition, it is possible to effect both a groupwise typing up of the animals with individual release, and a groupwise release of the animals with individual typing up.

I claim:

1. Stabling apparatus for restraining animals within a stall, comprising:
   a frame;
   an actuating head supported on said frame for rotation about a vertical axis above an animal to be restrained;
   a rope support secured to the floor of said stall;
   a length of rope having its opposite ends secured to said rope support and its midportion carried by said actuating head, with said rope being crossed above and below said animal's neck to define an animal-restraining loop; and
   adjustment means to selectively rotate said actuating head relative to said frame.

2. Apparatus as set forth in claim 1 wherein said actuating head includes a horizontally extending rail and rollers are mounted on said rail to receive the midportion of said rope.

3. Apparatus as set forth in claim 1 which includes means for locking said actuating head against rotation relative to said frame independently of said adjustment means.

4. Apparatus as set forth in claim 1 wherein said adjustment mean includes a manually actuated crank.

5. Apparatus as set forth in claim 2 which includes means for locking said actuating head against rotation relative to said frame independently of said adjustment means.

6. Apparatus as set forth in claim 2 wherein said adjustment means includes a manually actuated crank.

7. Apparatus as set forth in claim 3 wherein said adjustment means includes a manually actuated crank.

8. Apparatus as set forth in claim 1 which also includes a horizontal guide rail and means to selectively secure said guide rail to said frame at a point above the neck of the animal being restrained.